United States Patent
Lundahl et al.

(10) Patent No.: US 6,431,450 B1
(45) Date of Patent: Aug. 13, 2002

(54) BARCODE SCANNING SYSTEM FOR READING LABELS AT THE BOTTOM OF PACKAGES ON A CONVEYOR

(75) Inventors: Robert Lundahl, Frederick; Mark Klemick, Columbia, both of MD (US)

(73) Assignee: Advanced Technology & Research Corp., Burtonsville, MD (US)

( * ) Notice: Subject to any disclaimer, the term of this patent is extended or adjusted under 35 U.S.C. 154(b) by 0 days.

(21) Appl. No.: 09/395,272

(22) Filed: Sep. 13, 1999

(51) Int. Cl.⁷ .................................................. G06K 7/10
(52) U.S. Cl. .......................... 235/462.43; 235/462.14; 198/804
(58) Field of Search ................. 235/462.43, 462.01, 235/462.14, 479, 459; 209/583, 584, 3.3; 198/817, 502.1, 810.01, 804

(56) References Cited

U.S. PATENT DOCUMENTS

| | | | | |
|---|---|---|---|---|
| 4,204,640 A | * | 5/1980 | Fuller | 235/476 |
| 4,939,355 A | * | 7/1990 | Rando et al. | 235/467 |
| 5,315,094 A | * | 5/1994 | Lisy | 235/385 |
| 5,446,271 A | * | 8/1995 | Cherry et al. | 235/462 |
| 5,869,827 A | * | 2/1999 | Rando | 235/462.4 |
| 5,984,186 A | * | 11/1999 | Tafoya | 235/462.24 |

FOREIGN PATENT DOCUMENTS

EP  08851375  * 1/1998  ............ 235/462.43

* cited by examiner

Primary Examiner—Michael G. Lee
Assistant Examiner—Daniel St. Cyr
(74) Attorney, Agent, or Firm—H.C. Lin Patent Agent

(57) ABSTRACT

A conveyor with narrow apertures enables barcode scanning devices to be mounted under the conveying surface so they may scan and read data from tags and labels located on the bottom surface of material being transported by the conveyor. Multiple apertures and scanning devices are oriented at different angles to each other to assure that at least one of the scanning devices has an optimal orientation to reliably read barcodes or labels which may be randomly oriented on the conveying surface.

7 Claims, 6 Drawing Sheets

BARCODE SCANNING SYSTEM FOR READING LABELS AT THE BOTTOM OF PACKAGES ON A CONVEYOR

BACKGROUND OF THE INVENTION

(1) Field of the Invention

This invention relates to package scanning systems, in particular to scanning bar code from of the bottom-surface of packages being transported in a continuous motion along a conveyor.

(2) Background of the Invention

The use of barcode labels is a popular method for attaching machine-readable data to a wide variety of products and materials. Barcode scanners are used to interrogate the barcode labels and the data read from the label is used in a variety of identification, tracking, and control applications. When the scanner scans the bar code in a direction other than perpendicular to the bars of the labels, some of the bars may be missed during scanning. To cover a oblique bar code, the barcode label may be scanned multiple numbers of times line by line over an area of the bar code frame like the rasters of a television picture. Then the labels are less likely to be missed. For more versatility, the barcode may be scanned from light sources oriented from different directions. The readings from multiple passes are composed to "reconstruct" the correct code.

In many material-handling systems, barcode scanners are used to automatically interrogate packages or parcels as they are transported on a conveyor. In highly automated applications, multiple barcode scanners are used in what is called a "scanning tunnel" to simultaneously scan multiple sides of a package and thus accommodate a nearly random orientation of packages on the conveyor. Current technology has limited the effectiveness of the scanning tunnel applications to reading the top and sides of the packages only. Reading the bottom surfaces is problematic since the typical conveying mechanism blocks the optical view of the package from underneath the conveyor. Optical scanners sweep the reading area with a scanning laser or line scanning imaging camera. These systems need a full and unrestricted view of the reading area, i.e. the scanner must not miss a single bar of the barcode label. Any optical restriction across the viewing area which cause any bar to be missed by the scanner, no matter how small, causes error in the scanning process and make the scanning ineffective. When a package is transported on a conveyor, the surface on which the barcode is printed may appear on any one surface of the six sides of a rectangular box, which is randomly thrown on the conveyor belt. If the barcode happens to be printed on the underside, then the scanner is unable to read the bar code. Reading barcodes from underneath the conveying surface is further complicated by a random orientation of the barcode labels. Barcode reading technology requires that all elements of the printed barcode symbols be read by the optical sweep of the scanner laser. Different barcode labels have different aspect ratios for the height and width of the field of barcode symbols. A single barcode scanner can effectively read a given barcode label only within a specific tolerance to angular offset. Beyond this angular tolerance the geometry will not allow the scanning line to pass through all barcode symbols and reading the label data is not possible. Recent advances in software allow a certain amount of "reconstruction" of the entire barcode data from multiple successive yet partial reads of the printed symbol array. This technique effectively increases the angular tolerance for the reading the barcode data. However there is still a practical limit to the degree of reconstruction and multiple scanning line orientations are needed to read randomly oriented barcodes.

More advanced Omni and Holographic style scanners emit a multitude of scanning lines at different orientations from the same scanner. This technique has a lower read rate since a single scanner will produce many scanning lines for the one orientation that is successful. However this technique greatly improves the probability of getting a successful read from a single scanner. Omni and Holographic scanners have been successfully used for reading the underside surface of packages, but not on a conveyor belt. A common application is in a grocery store check out line where an Omni-directional and/or holographic scanner is mounted underneath a glass plate where the clerk will push the product over. This solution is effective however the size of the viewing aperture required makes this technique difficult to integrate in a fully automatic conveyor system which will maintain high production rate of material transport. Another problem is the need for human handling, which is not cost effective.

SUMMARY OF THE INVENTION

The object of this invention is to read the bar code at the underside of a package being transported on a conveyor. Another object of this invention is to construct a conveyor capable of reading the bar code at the underside of the package. Still another object of this invention is to perform underside scanning of packages continuously in a steady flow on an automatic conveyor transport system. A further object of this invention is to provide an inexpensive and less labor intensive scanning system for reading the barcodes.

These objects are accomplished by designing a conveyor with several narrow and open apertures over which material is smoothly transported as if on a continuous surface. The multiple apertures are positioned at different angles to each other and each aperture provides a dedicated scanner to the bottom side of packages being transported on the conveying surface. The number of apertures and their angular position is determined, in part, by the aspect ratio of the barcodes that are to be processed. The multiple barcode scanners mounted at different angles collectively read the barcode on the underside of a transported package regardless of its orientation.

The invention presents an inexpensive technique to perform underside scanning of packages with convenient high speed linear scanners as they are transported in a steady flow on an automatic conveyor transport system.

BRIEF DESCRIPTIONS OF SEVERAL VIEWS OF THE DRAWING

FIG. 1 provides an overview of a strip belt conveyor that incorporates three scanning apertures and oriented a 45 degrees to each other.

DETAILED DESCRIPTION OF THE INVENTION

Figure 1:
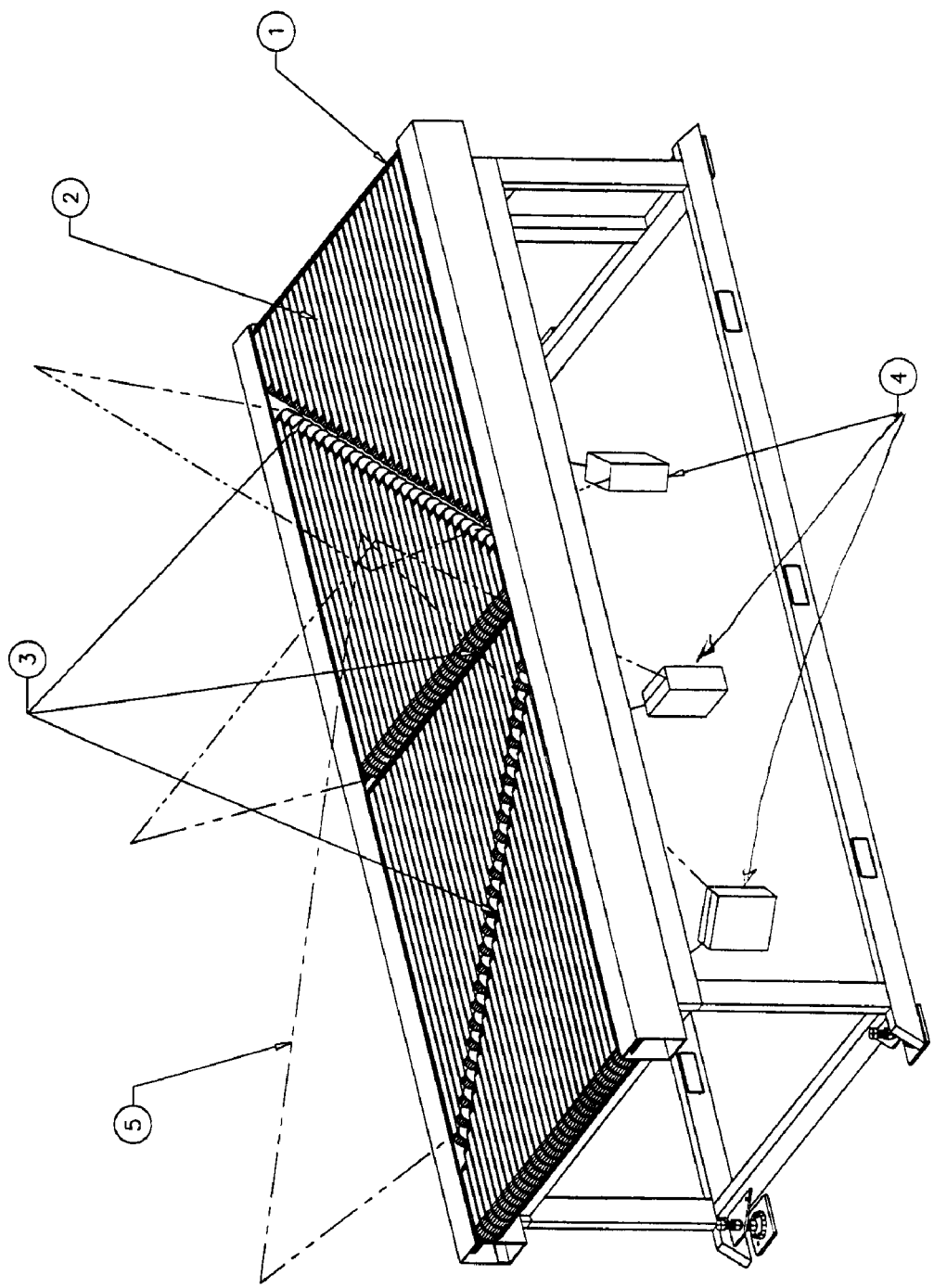

The basic design feature of this invention is shown in FIG. 1. the incorporation of multiple slit type apertures within a functionally continuous conveying surface as shown in FIG. 1. These apertures are formed by the intentional gaps left between a series of individual viewing sections where these individual sections can move in unison to smoothly transport material as if it were being transported an a single and continuous surface. The shape and combination of individual conveying sections will determine the angles and the positions of the viewing apertures.

There are many possible layouts and orientation of the viewing apertures. A three-scanner layout at 45-degree increments provides a reasonable baseline for reading randomly oriented barcode labels. The aspect ratio of most standard barcode labels will permit standard scanners to read barcodes with a tolerance of plus or minus 22.5 degree from an ideal orientation where the bar symbols are perpendicular to the scanning line. Positioning three scanners at 45 degrees increments will provide a full 360-degree coverage to accommodate a random orientation of labels. Different labels or other considerations may require a different number of scanners at different angular offsets.

Mechanically there are many ways that the aperture features can be incorporated into the conveying surface and only a few selected methods are presented here.

FIG. 1 illustrates one embodiment of the invention where the conveying surface is formed from four individual conveying sections where each section is built using a close loop, strip belts technique. Multiple strip belts 1 are used to form each individual conveyor section 2 with one angled side. These conveyor sections are positioned to transport packages in a linear flow and spaced to leave open gaps at the interface between conveyor sections. These gaps or apertures 3 provide open and clear visibility through the conveying surface. Several optical scanning units 4 are positioned underneath the conveying surface and in a position to utilize clear apertures to view the bottom of packages being transported by the conveying surface. Each scanner produces an upward fan type pattern 5 for data acquisition from the underside of materials transported on the conveying surface. In this configuration the multiple apertures and scanning are oriented at 45 degrees with respect to each other.

Figure 2:
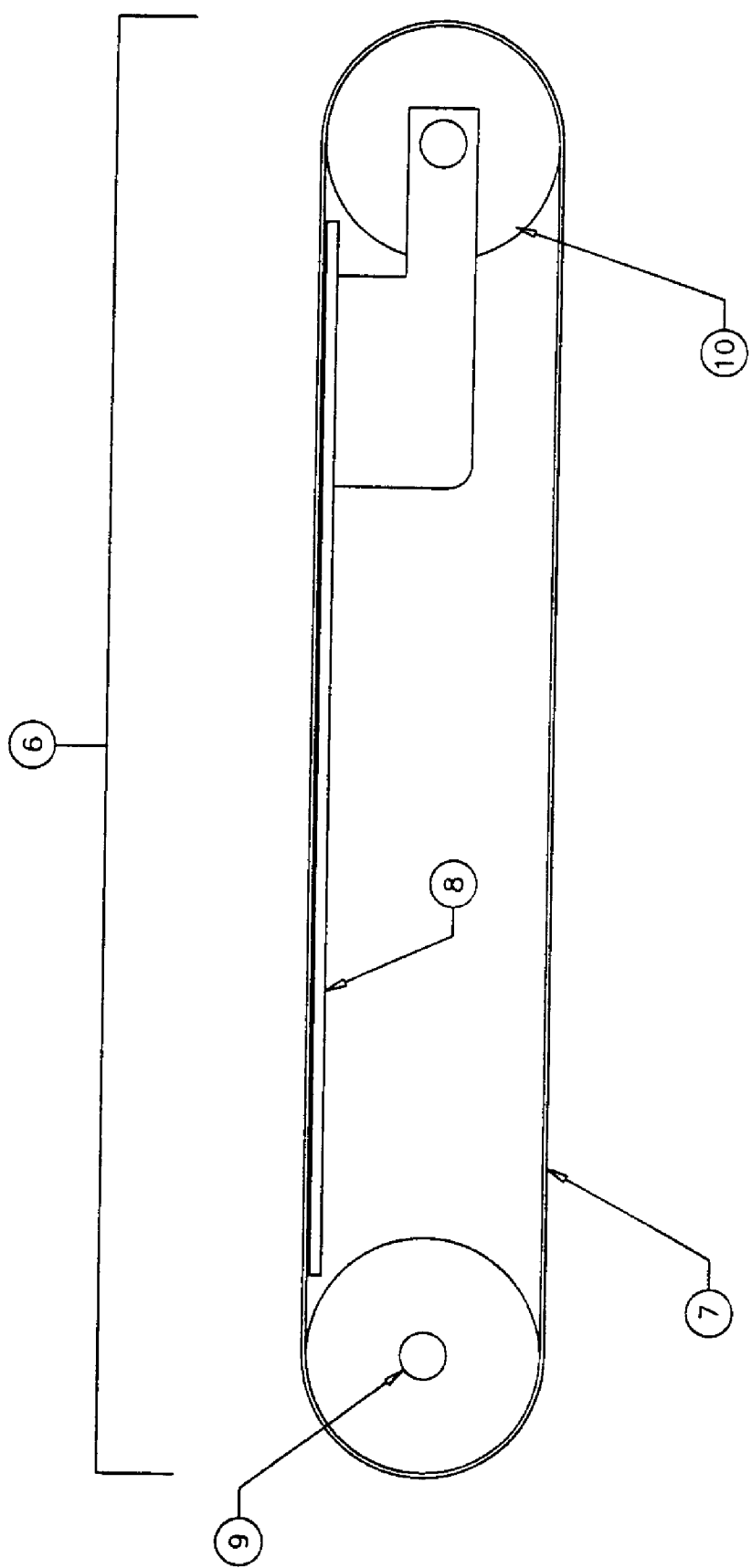
FIG. 2 shows the general components of a strip belt.

FIG. 2 shows the general components of the strip belt conveyor where the conveying surface 6 is comprised of a strip belt 7 running over a slider bed 8 affixed by a spool roller 9 and tensioned by a nose roller 10 at the other end.

Figure 3:
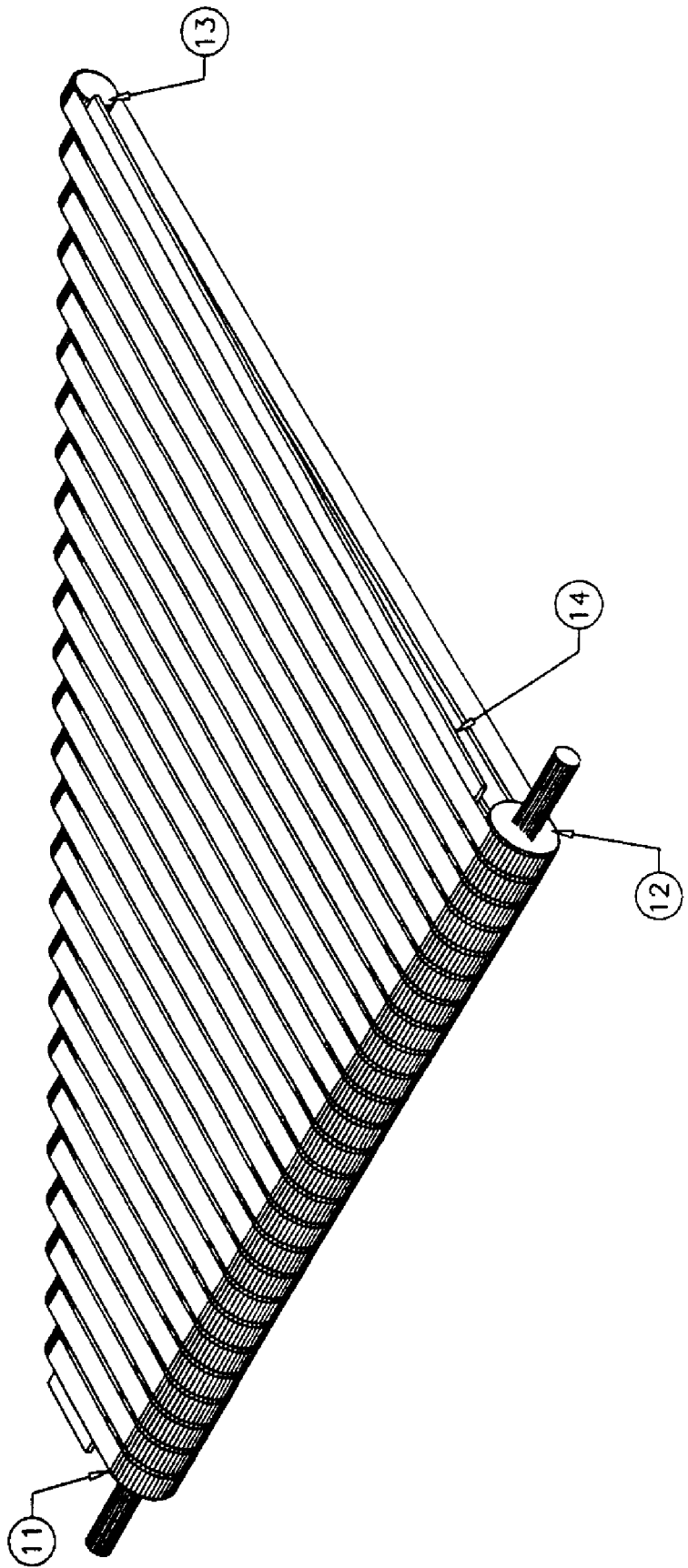
FIG. 3 shows an angled section of strip belts conveyor.

These basic components are combined to build an angled conveyor section shown in FIG. 3 where multiple strip belts 11 are mechanically connected by a common spool roller 12 and are tensioned by individual nose rollers 13 held in place by the slider plate 14. The positioning of the nose rollers with a specific offset with respect to each other results in an angled termination of the conveyor section.

Figure 4:
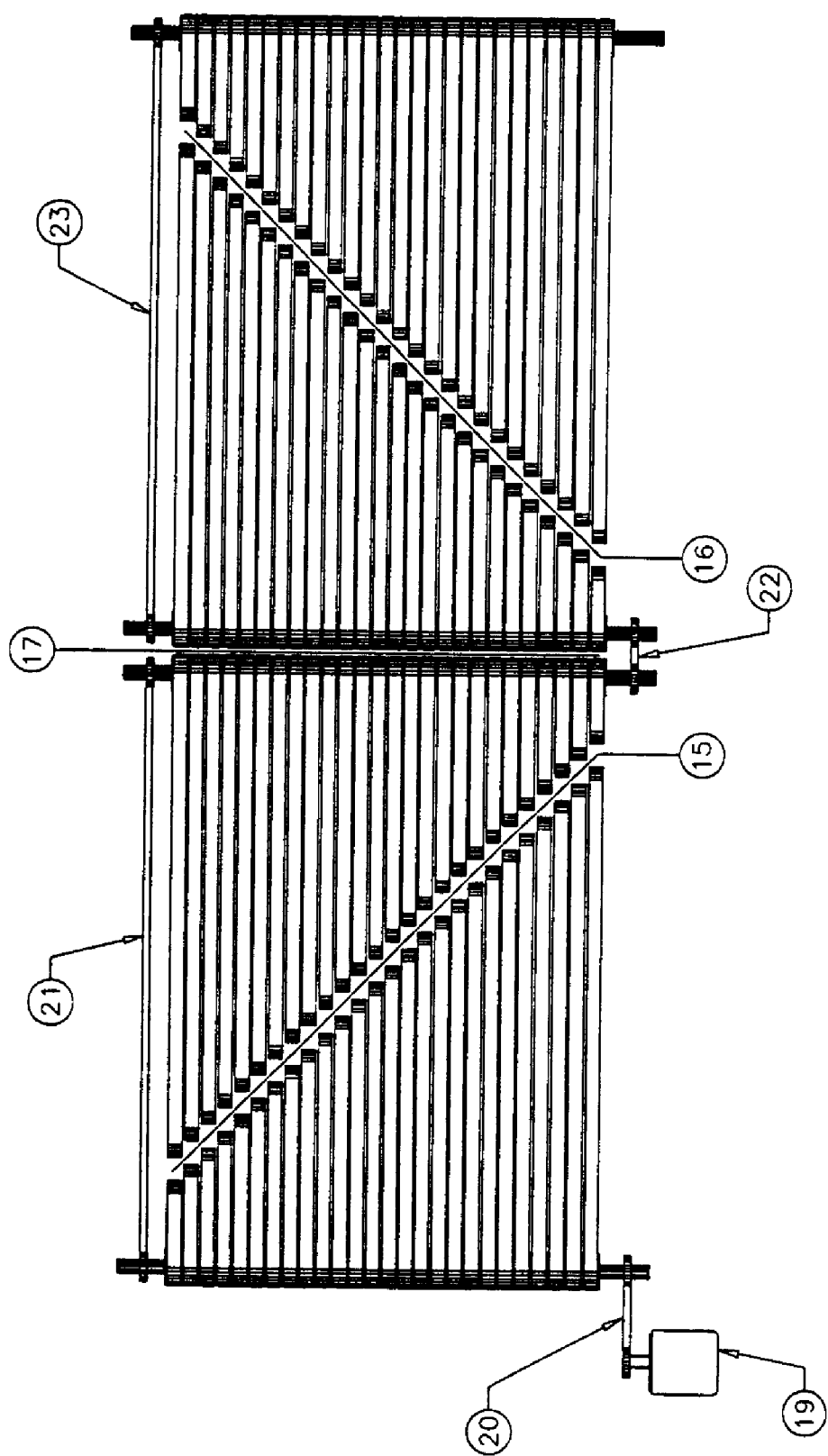
FIG. 4 shows how four angled sections of strip belt conveyor sections can be combined to form a continuous conveying surface with three open apertures.

FIG. 4 illustrates how four of these angled conveyor sections are combined in to form a continuous conveying surface where three open and clear apertures defined between adjacent sections. The angled apertures 15 and 16 are defined at the intersection of the angled sides between two conveyor sections. The straight aperture 17 is formed at the intersection of two spool rollers between two adjacent conveyor sections. The conveying surface is powered by a single motor 19 and. connecting drive belts 20, 21, 22 and 23 so that the four individual sections drive in unison and provide smooth material transport across the length of the conveyor and between conveyor sections.

Figure 5:
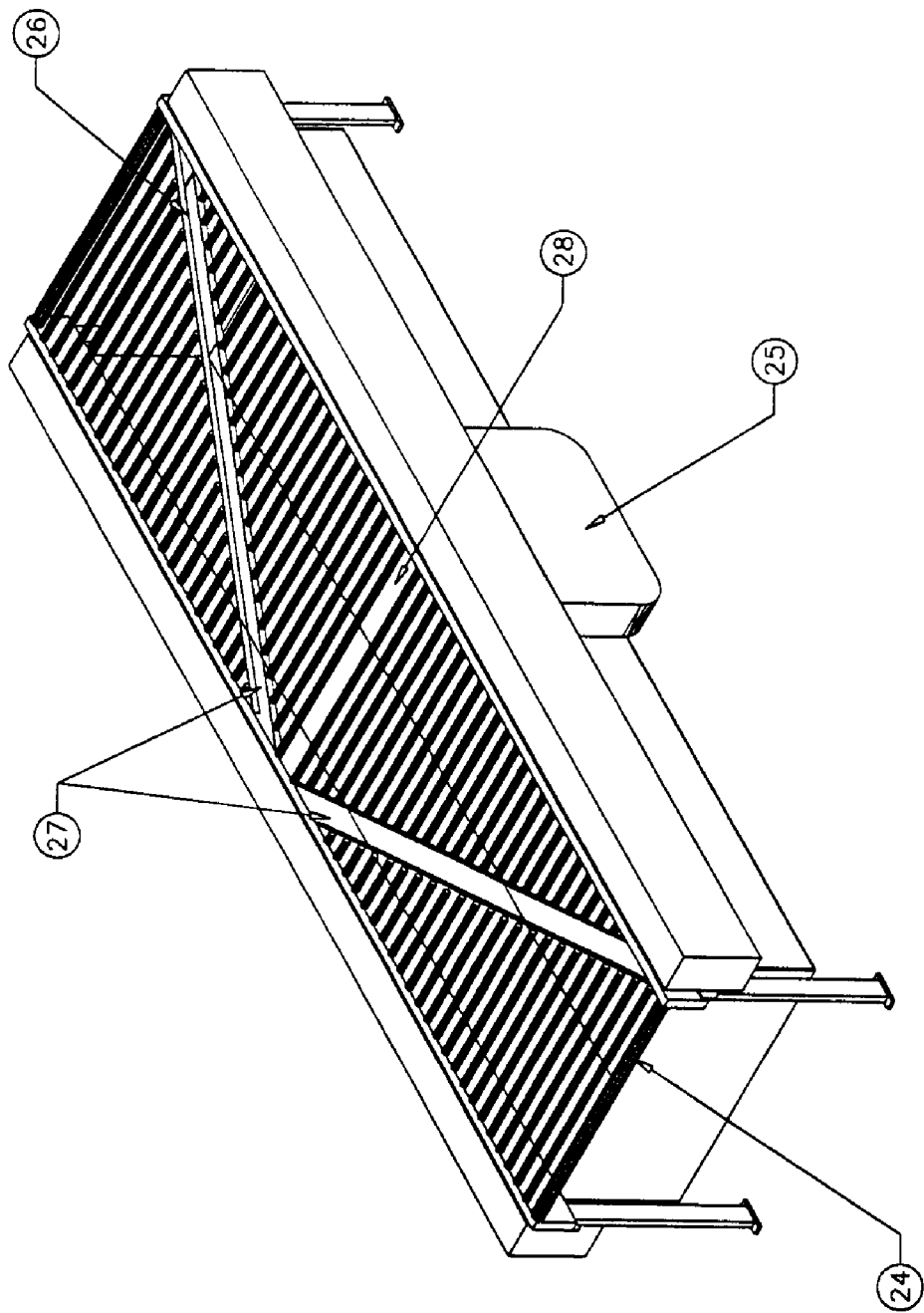
FIG. 5 shows an alternate construction where rollers are used to form the angled conveyor sections.

FIG. 5 shows another embodiment of the conveyor assembly where the conveying surface is made from rollers. Rollers 24 extend across the conveying surface and are powered to rotate and transport the conveyed material. The motor 25)that keeps the rollers in continuous motion is mounted on the bottom of the conveyor bed. The rollers are specialized with their small size and very close center to center placement so that even the smallest package will be transported smoothly. The diagonal frame members 26 provide bearing support for the inside ends of the rollers and permit the formation of an unrestricted gap through the rollers while maintaining structural integrity. In the angled apertures 27 rollers are terminated at the diagonal support brackets. Support brackets between adjacent sections define the apertures used for scanning from underneath. A pair of rollers in the central section forms the perpendicular aperture 28 to compliment the other two angled apertures. Drive components in the conveyor side rails would power all rollers so that they rotated in unison and provide smooth material transport across the length of the conveyor and between conveyor sections.

Figure 6:
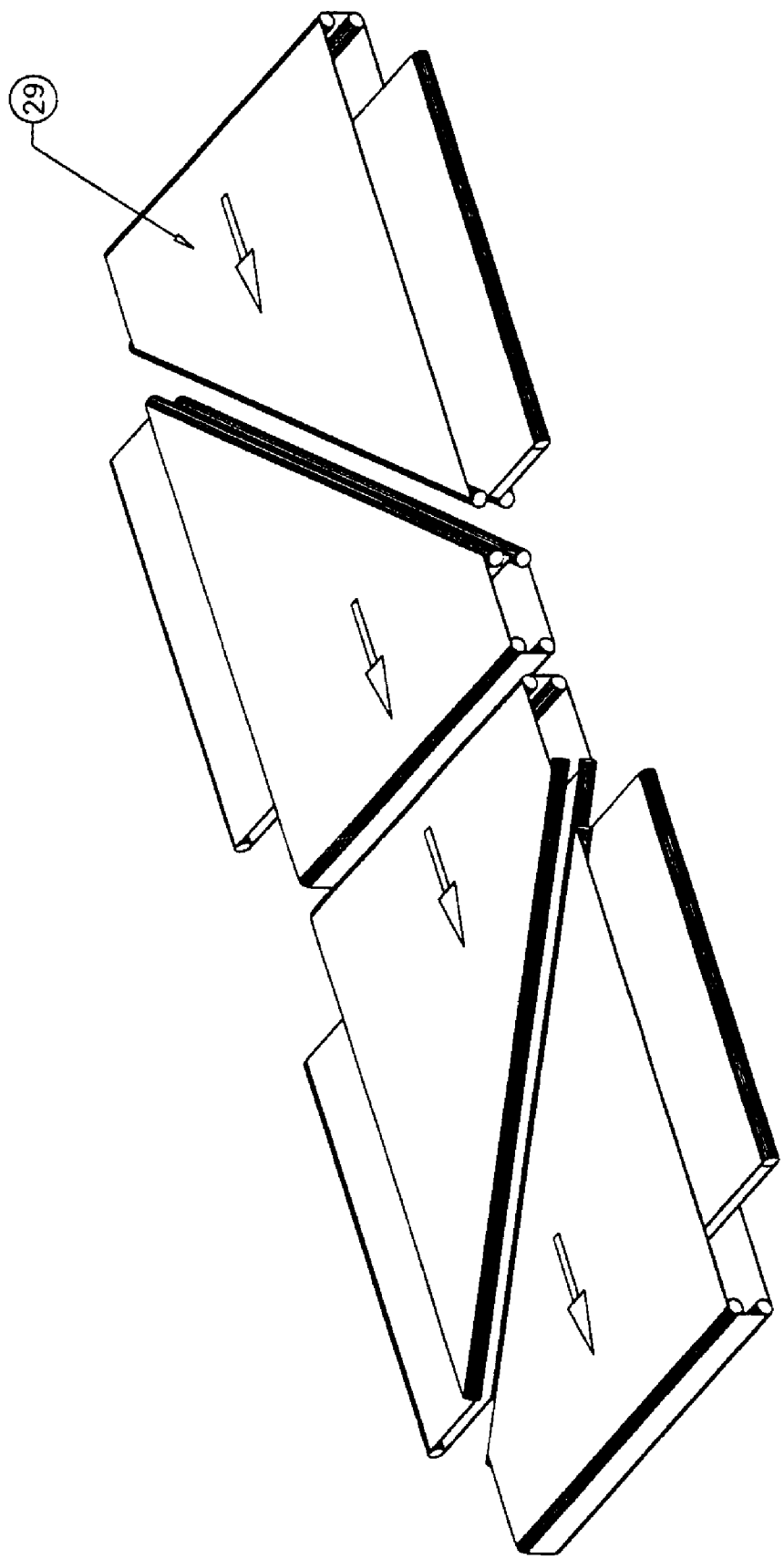
FIG. 6 shows an alternate construction where folded flat belts are used to form the angled conveyor sections.

FIG. 6 shows another method to build the conveyor bed with the separate angled conveying sections are made from folded belts. Each conveyor section 29 is made from an endless belt folded into a 90-degree angle. Four of these sections are arranged in a pattern where three apertures are formed between the angled and straight ends of adjacent sections. Drive components outside the conveyor side rails would power all four folded belts so that they provide a smooth material transport across the length of the conveyor and between conveyor sections.

While the foregoing description illustrates a conveyor belt with three apertures with four 45 degrees sections, it should be pointed out that the invention is not limited to exactly four 45 degree sections. Theoretically, three sections with orthogonal apertures should be sufficient. However, the addition of another section and another aperture can tolerate more variations in the mechanical dimensions and fluctuations in conveying speed. In the same token, more than four section and more than three apertures are also possible.

While the preferred embodiment of the invention has been described in connection with a system to read bar codes at the underside of a package moving on a conveyor belt, it will be apparent to those skilled in the art that various modifications may be made in the embodiment for use in a conveying system without departing from the spirit of the present invention. Such modifications are all within the scope of this invention.

What is claimed is:

1. A barcode reading system for reading barcode label information in underside of moving packages comprising:
    a conveying surface;
    at least three individual conveying sections on said conveying surface moving at a similar linear speed along the packages' direction, wherein the individual conveying sections are formed by a Plurality of individual narrow closed loop belts, each extending over a common roller on one end and an individual roller on another end, said individual roller being offset with respect to the common roller to form an angle;
    interfaces between said sections forming at least two apertures oriented at an angle relative to each other;
    multiple barcode scanning devices;
    said apertures being not parallel with each other to allow said multiple barcode scanning devices to scan barcode labels at different angles as the barcode label is transported over the conveying surface.

2. The barcode reading system as described in claim 1, wherein there are four said sections and three said apertures.

3. The barcode reading system as described in claim 2 wherein said apertures are oriented at 45 degrees with respect to each other.

4. The barcode reading system as described in claim 1, wherein there are as many said data collection devices as there are said apertures, each scanning a light beam along one of said apertures to interrogate said barcode.

5. The barcode reading system as described in claim 4, wherein said data collection devices are lasers.

6. The barcode reading system as described in claim 1 wherein the individual conveying sections are formed by multiple rollers each extending from a side perpendicular to the direction of said moving packages and termination at an cross member which is at an angle with respect to the rollers axes.

7. The barcode reading system as described in claim 1 wherein one of the conveying sections are formed by an endless belt which has two end rollers at one end of said conveying sections and a pair of interim rollers at the other end to create an angled edge to each one of said conveying sections with respect to axes of the direction of the moving packages.

* * * * *